United States Patent
Alaksza et al.

(10) Patent No.: US 8,498,630 B2
(45) Date of Patent: Jul. 30, 2013

(54) LOCATION BASED AUTOMATIC DIALLING

(75) Inventors: Bence Alaksza, Csipkerozsa (HU);
Miguel Angel Castro, Hampshire (GB);
Nigel Dunne, West Sussex (GB); Mark Fairbrother, Hampshire (GB); Robin Anthony Foreman, Waterlooville (GB);
Darren Holmes, Portsmouth (GB);
Terry Peter David Stebbens,
Portsmouth (GB); Mark G. Wildie,
London (GB)

(73) Assignee: Avaya UK, Avaya House Cathedral Hill, Guildford Surrey (GB)

( * ) Notice: Subject to any disclaimer, the term of this patent is extended or adjusted under 35 U.S.C. 154(b) by 1016 days.

(21) Appl. No.: 11/624,480

(22) Filed: Jan. 18, 2007

(65) Prior Publication Data
US 2008/0026751 A1 Jan. 31, 2008

(30) Foreign Application Priority Data
Jul. 27, 2006 (EP) .................................... 06253925

(51) Int. Cl.
*H04M 3/00* (2006.01)

(52) U.S. Cl.
USPC ........ 455/418; 455/414.1; 455/417; 455/433; 455/445; 455/456.1; 455/456.3; 455/460; 455/560; 455/561; 455/564

(58) Field of Classification Search
USPC ............... 455/414.1, 456.1–456.6, 460, 563, 455/564, 567, 414.2, 414.3, 518, 519, 418, 455/419, 420, 433, 565, 404.1, 404.2, 417, 455/445, 560, 561
See application file for complete search history.

(56) References Cited

U.S. PATENT DOCUMENTS

| 5,515,043 | A | | 5/1996 | Berard et al. | |
|---|---|---|---|---|---|
| 5,819,180 | A | * | 10/1998 | Alperovich et al. | 455/465 |
| 6,119,014 | A | * | 9/2000 | Alperovich et al. | 455/466 |
| 6,122,509 | A | * | 9/2000 | Nguyen | 455/433 |
| 6,484,033 | B2 | * | 11/2002 | Murray | 455/456.3 |
| 6,625,457 | B1 | * | 9/2003 | Raith | 455/456.1 |
| 6,633,763 | B2 | * | 10/2003 | Yoshioka | 455/457 |
| 6,819,919 | B1 | * | 11/2004 | Tanaka | 455/414.1 |
| 6,941,134 | B2 | * | 9/2005 | White | 455/418 |
| 7,194,257 | B2 | * | 3/2007 | House et al. | 455/418 |
| 7,349,710 | B2 | * | 3/2008 | Kaplan et al. | 455/466 |
| 7,570,959 | B2 | * | 8/2009 | Nurmi | 455/456.1 |
| 2004/0192270 | A1 | * | 9/2004 | Kreitzer | 455/414.1 |
| 2005/0215243 | A1 | * | 9/2005 | Black et al. | 455/417 |
| 2006/0094447 | A1 | * | 5/2006 | Zellner | 455/456.3 |
| 2007/0093235 | A1 | * | 4/2007 | Kimbrell | 455/412.1 |

FOREIGN PATENT DOCUMENTS

| EP | 06253925 | 12/2006 |
|---|---|---|
| WO | 2004/004372 A1 | 1/2004 |
| WO | 2004004372 A1 | 1/2004 |

OTHER PUBLICATIONS

Rothluebbers, C., "EP Application No. 06253925.9-1525 Office Action Jan. 3, 2007", , Publisher: EPO, Published in: EP.

* cited by examiner

Primary Examiner — Olumide T Ajibade Akonai

(57) ABSTRACT

There is disclosed a method and apparatus for initiating a call in a mobile telephone system, comprising the steps of: comparing a current location of a mobile terminal to at least one predetermined location; and, responsive to a location match, initiating a call from the mobile terminal to a predetermined number associated with said at least one predetermined location.

20 Claims, 3 Drawing Sheets

| | LOCATION | RANGE | TIME | NUMBER |
|---|---|---|---|---|
| | | | | |
| 210 → | $X_1, Y_1$ | 2 KM | 5-6 PM | +44 7123 1234 |
| | | | | |
| 212 → | $X_2, Y_2$ | 1 KM | - | +44 7321 1234 |
| | | | | |
| | 202 | 204 | 206 | 208 |

FIG. 2

LOCATION BASED AUTOMATIC DIALLING

PRIORITY CLAIM

The present application claims the priority of European Patent Application No. 06253925.9 filed Jul. 27, 2006.

BACKGROUND TO THE INVENTION

1. Field of the Invention

The present invention relates to location based services in telephone systems, and particularly but not exclusively in mobile telecommunication systems.

2. Description of the Related Art

A user of a mobile telephone apparatus, such as a mobile cellular telephone, may typically always place certain telephone calls in certain situations. These situations are often associated with a user's location. Example situations include dialling home on the way back from work, or dialling a hotel or car rental company on arrival at an airport.

In such instances it is necessary for the user to dial the number, in some instances having first located or retrieved the appropriate number, and then initiate the call. In scenarios where a user will always want to dial a particular number, the user also has to remember to make the call.

It is an aim of the invention to provide an improved automated dialling technique.

SUMMARY OF INVENTION

In one aspect of the invention there is provided an apparatus for a mobile telephone system, the apparatus comprising: a location comparator for comparing a current location of a mobile terminal to at least one predetermined location; and a controller, responsive to a location comparator match, for initiating a call from the mobile terminal to a predetermined number associated with said at least one predetermined location.

The apparatus may further comprise a memory for storing said at least one predetermined location and the predetermined number.

The apparatus may further include a time comparator for comparing a current time to a predetermined time associated with the at least one predetermined location, wherein the controller is further responsive to a time comparator match.

The memory may further store said at least one predetermined time.

The at least one predetermined location may correspond to a geographical position or a geographical area.

The apparatus may further comprise a location determining means for determining the location of the mobile terminal.

The apparatus may further comprise an interface for receiving the location of the mobile terminal.

The interface may be a communication link established with a communications network with which the mobile terminal is connected.

A mobile terminal may include the apparatus. A mobile telecommunications network may include the apparatus.

In another aspect of the invention there is provided a method of initiating a call in a mobile telephone system, comprising the steps of: comparing a current location of a mobile terminal to at least one predetermined location; and, responsive to a location match, initiating a call from the mobile terminal to a predetermined number associated with said at least one predetermined location.

The method may further comprise the step of retrieving said at least one predetermined location and the predetermined number from memory.

The method may further include the step of comparing a current time to a predetermined time associated with the at least one predetermined location, wherein step of initiating the call is further responsive to a time comparator match.

The method may further comprise the step of retrieving said at least one predetermined time from memory.

The predetermined time may correspond to a time window or a date/time window.

The at least one predetermined location may correspond to a geographical position or a geographical area.

The method may further comprise the step of determining the location of the mobile terminal.

The method may further comprise the step of receiving the location of the mobile terminal.

The method may further comprise the step of receiving the location of the mobile terminal on a communication link established with a communications network with which the mobile terminal is connected.

BRIEF DESCRIPTION OF THE FIGURES

The invention will now be described by way of example with reference to the accompanying drawings in which:

FIG. 2 illustrates a table for storing in memory in accordance with an embodiment of the present invention.

DESCRIPTION OF PREFERRED EMBODIMENTS

The invention is described herein by way of reference to one or more preferred embodiments. Such embodiments are examples of implementations of the invention, and the invention is not limited to such embodiments.

The present invention provides for the automatic dialling of a telephone number from a mobile telephone apparatus in dependence upon a current location of the mobile telephone apparatus. Preferably one or more predetermined locations are stored in the mobile telephone apparatus, together with an associated telephone number. If the current location of the mobile telephone apparatus matches one or more stored locations, then the associated telephone number is automatically dialled. The invention, and modifications thereto, will be best understood by referring to the following description, in which various embodiments are described.

Figure 1:
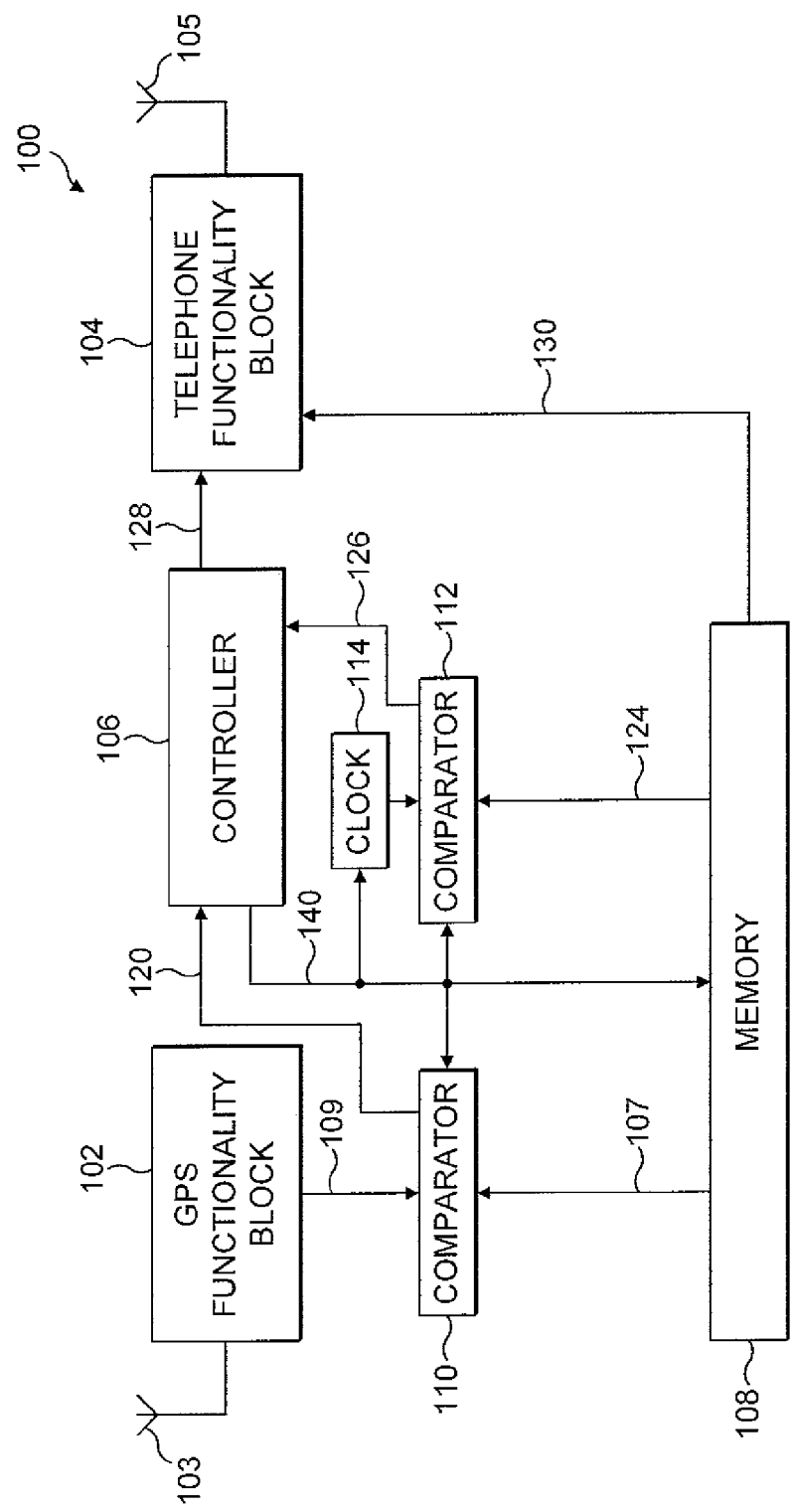
FIG. 1 illustrates a block diagram of functional blocks for implementing an embodiment of the invention.

Referring to FIG. 1 there is illustrated the main functional elements of a mobile telephone apparatus for implementing a preferred embodiment of the invention. The invention may be implemented in any telephone apparatus which is moveable and not tied to a fixed location, and which can thus be described as mobile or portable. In the preferred embodiment, the invention is described in the context of a mobile telephone which may be arranged to connect to a wireless cellular communication network.

In FIG. 1 there is shown a telephone functionality block 104. This block is assumed to contain all the functional elements necessary to operate a mobile telephone device, as is well-known to one skilled in the art. This functionality may include, for example, the functionality to make and receive telephone calls, send and receive text messages, and to support interactive services. The invention does not propose adaptation of any such functionality. The telephone functionality block 104 is connected to an antenna 105 for wireless communication with a mobile communications network.

In FIG. 1 there is also shown a GPS functionality block 102. This block is assumed to contain all the functional elements necessary to provide GPS functionality, as is well-known to one skilled in the art. This functionality includes the provision of location information. The GPS functionality block 102 is connected to an antenna 103 for wireless receiving of signals from GPS satellites.

The remaining functional elements illustrated in FIG. 1 are those which are required for implementing a preferred embodiment of the invention, which preferred embodiment is implemented in a mobile telephone apparatus having telephone functionality and GPS functionality.

As is illustrated in FIG. 1, there is further provided in the mobile telephone apparatus: a memory or storage block 108; a control block, control circuit or controller 106; a compare block or comparator 110; a compare block or comparator 112; and a clock 114.

The memory 108 is adapted to store information in order to enable the functionality of the invention. The memory 108 stores at least one location identity. The memory further stores associated with each at least one location identity a telephone number. The location identity may be a specific geographical location, or may be a geographical area.

In the described embodiment, the data stored in the memory 108 is illustrated in tabular form in FIG. 2. The table of data 200 includes a column 202 of locations, and a column 204 of ranges. In this preferred embodiment a specific location is identified in column 202, and then in column 204 there is stored an associated range for that location. In column 206 there is stored a time associated with each location stored in column 202. In column 208 there is stored a telephone number associated with each location stored in column 202.

In accordance with the principles of the invention, in this embodiment if a mobile telephone apparatus is determined to be within range (identified in column 204) of a specific location (identified in column 206), then the associated telephone number (identified in column 208) is automatically dialled. In this preferred embodiment the telephone number is only dialled if the time of day additionally corresponds to a specific time or time window (identified in column 206).

Referring further to FIG. 2, there are illustrated example entries for the columns of the table 200.

In row 210 a location is defined in column 202 by coordinates $X_1, Y_1$. Associated therewith in column 214 is a range of 2 miles, in column 206 a time of between 5 pm and 6 pm, and in column 210 a telephone number +44 7123 1234.

In row 212 a location is defined in column 202 by coordinates $X_2, Y_2$. Associated therewith in column 214 is a range of 1 mile, in column 206 no time is specified, and in column 210 a telephone number +44 7321 1234.

The definition of the location given in column 202 will depend upon the nature of the location data provided. In the described embodiment this is provided by a GPS system, and therefore the coordinate information in column 202 will be compatible with coordinate information generated by a GPS system.

The inputting of information forming the table of FIG. 2 into the memory 108 may be achieved in a variety of ways. In one preferred arrangement, the mobile telephone apparatus operates an appropriate software application program which provides a user interface on the display of the mobile telephone apparatus, which user interface is specifically adapted to provide for location automated telephoning in accordance with the invention. Such user interface may be accessed, for example, via an icon on a menu displayed on the display of the mobile telephone apparatus. This user interface may be accessed by a user, for example, when the user is currently in a location for which an automated dialling option is desired. When accessing the user interface, the user may simply be required to select an option to set a location configuration, and then the current location—obtained via the GPS functionality of the phone—may then be entered into the memory. A sequence of command prompts on the phone may then ask the user to enter the number to be automatically dialled, and optionally a range for the location and a time during which the number may be dialled. In such a preferred manner of configuring the operation of location based automated dialling, the user configuration is straightforward.

The location based automated dialling may alternatively be configured in other ways. For example the user may be able to specifically enter coordinates of interest. The user may also be able to enter a place name, and the mobile telephone apparatus may be adapted to configure the location and range by accessing an appropriate database using that place name.

Whilst the configuration can be simply achieved with the user interface of the mobile telephone apparatus, in an alternative the configuration may take place via a wireless network or system with which the mobile telephone apparatus is configured. For example a telephone service operator may offer an internet portal by which users may configure their preference for location based automated dialling. Once configured, the network may transfer this information to the memory of the user's mobile telephone apparatus.

Referring again to FIG. 1, the operation of a preferred embodiment of the invention will be described in conjunction with the flow diagram of FIG. 3. The following description assumes that the mobile telephone apparatus has been configured with at least one predetermined location, associated range, time and telephone number.

The GPS functionality block 102 provides current location information on line 109 to a first input of the comparator 110. The receipt of the current location information at the comparator 110 is denoted by step 302 in FIG. 3. The memory 108, under control of the controller 106 via a control bus 140, provides a stored predetermined location on line 107 to a second input of the comparator 110. The receipt of the stored predetermined location information at the comparator 110 is denoted by step 304 in FIG. 3. Where the memory 108 stores a number of different predetermined locations, these may be retrieved from memory cyclically under the control of controller 106.

Figure 3:
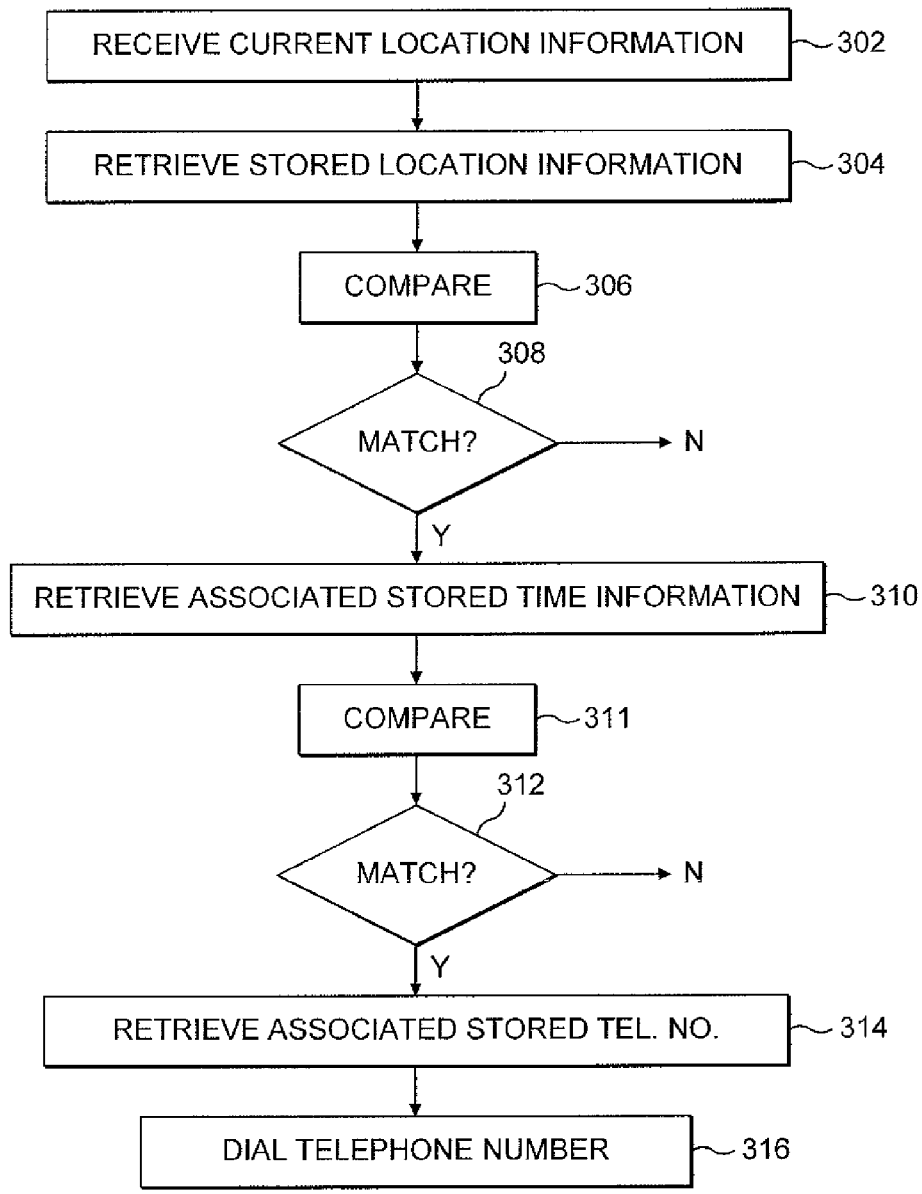
FIG. 3 illustrates a sequence of method steps in an embodiment of the invention.

The comparator 110, as denoted by step 306 of FIG. 3, then compares the current location with a predetermined location. If such a comparison produces a match, as determined in step 308 of FIG. 3, then an appropriate signal is generated on line 120 to the controller 106.

If no match is found then the next stored location is compared or the next current location information is awaited.

The 'current location' information may be compared with stored predetermined locations on a cyclical basis. For example, the current location may be compared to the stored predetermined locations every 30 seconds.

Responsive to a match signal, as denoted by step 310 in FIG. 3, via control bus 140 the controller 106 retrieves the time information associated with the stored predetermined location from the memory 108. This time information is presented on line 124 to a first input of the comparator 112. The clock 114 provides current time information on line 122 to a second input of the comparator 112.

The comparator 112, as denoted by step 311 of FIG. 3, then compares the current time with a predetermined time. The predetermined time is preferably a time window and the comparison operation determines whether the current time falls in such time window. If such a comparison produces a match, as determined in step 312 of FIG. 3, then an appropriate signal is generated on line 126 to the controller 106.

If no match is found then the next stored location is compared or the next current location information is awaited.

Responsive to the second match signal, via control bus 140 the controller 106 retrieves, from memory 108, the telephone number associated with the predetermined location, as denoted by step 314 in FIG. 3.

The retrieved telephone number is presented from the memory on line 130 and provided as an input to the telephone functionality block 104. At the same time, the controller 106 provides a 'dial' control signal on line 128 to the telephone functionality block, which instructs the telephone functionality block to establish a call using the telephone number presented on line 130. Thus the telephone number is dialled in accordance with known techniques, as denoted by step 316.

The invention has been described by way of a particular embodiment, and one skilled in the art will appreciate that various modified implementations may be provided.

The definition of the predetermined location may be dependent upon the location technology used and the accuracy of such. For example if the location technology is such that a position of an apparatus can only be determined within a range of several hundreds of meters, then there may be no need to define a range together with a location. Alternatively where the location technology is such that a position of an apparatus can be determined very accurately, within a range of meters for example, then a user may exploit this to very accurately define the location at which an automated call is made.

Example implementations include a user who wishes to always telephone home on their way home from work, when they are approximately 2 km from home. In this way the entry in row 210 in the table 200 of FIG. 2 may be set-up, with the location in column 202 being the geographical location of the user's home. The time range 5 pm to 6 pm is set as being the time that the user will be in that area on their way home.

In respect of the time factor, this may be used in a number of ways. For example in an alternative implementation the mobile apparatus may be configured to determine it's location at a specific time, and in dependence on its location at that time to automatically dial an associated telephone number. For example a user may ordinarily leave their workplace at 5 pm. If they are still at their workplace at 5:30 pm they may wish always to telephone home to inform that they will be late. Thus in an alternative arrangement the controller 106 may be adapted to arrange the comparison of a current location with a predetermined location which is the user's workplace location, or within a certain distance of that workplace, at a certain time or in a certain time window. If that comparison results in a match then an automated telephone call is made.

The invention has been described in the context of using GPS functionality for determining a current location of a mobile telephone apparatus. However other location positioning functionality be used, whether satellite based or otherwise. For example the telephone functionality block 104 may receive location information from the telecommunications network with which it is associated, and this may be used as current location information. This may be geographical location information, or network location information such as a cell ID which identifies the cell of a cellular communication system in which the mobile telephone apparatus is connected. Where a cell ID is used for current location information, a predetermined cell ID may be stored in column 202 of the table of FIG. 2. Such an implementation may exploit the provision of location information to the mobile telephone apparatus for some other purpose, or specifically require modification to provide for location information to be regularly provided to the mobile telephone apparatus.

In a still further modification the telephone functionality and the location positioning functionality may be provided in separate devices adapted to communicate rather than in a single device. The separate devices may communicate, for example, by a Bluetooth link. An example scenario may be a vehicle equipped with a fitted GPS unit and a mobile phone provided separately thereto, for example a driver's personal mobile phone not fitted to the vehicle.

In a yet further modification, the functionality described with reference to FIGS. 1 and 3 may be provided in the network side of a mobile communication system. The network side of the system may monitor the location of mobile devices connected thereto, and automatically place telephone calls for a user in dependence upon location. The table information of FIG. 2 would be stored on the network side for each user. In such an implementation the location based automated calling would be a network service provided by a network operator, and may be a chargeable service.

It should be noted that reference in this description to a mobile telephone apparatus can be understood to be any mobile/portable device equipped to establish telephone calls. This may be a mobile cellular telephone, a cordless DECT telephone, or any number of PDA or portable computer devices having telephone functionality.

Further reference in this description to GPS functionality or a GPS device can be understood to be any device which provides for any type of location positioning functionality.

One skilled in the art will appreciate that various modifications to the invention as described herein by way of reference to various embodiments may be possible. The scope of protection afforded by the invention is determined by the appended claims.

The invention claimed is:

1. A method comprising:
    monitoring a physical location of a first communications terminal that is connected to a communications network, wherein the monitoring is performed by a node of the communications network other than the first communications terminal; and
    placing a call for the first communications terminal based on the physical location of the first communications terminal as compared to a predetermined location, wherein the call is placed by the node of the communications network other than the first communications terminal;
    wherein the call is placed only if the first communications terminal is found to be at the physical location during a user-specified time of day;
    wherein the call is placed in the absence of a request from the first communications terminal to place the call; and
    wherein the placed call is between the first communications terminal and a second communications terminal.

2. The method of claim 1 further comprising:
    receiving via an Internet portal:
    (i) an indication of a first location and
    (ii) a telephone number; and
    configuring the communications network to automatically place the call based on a correspondence between the physical location of the first communications terminal and the first location, wherein the first location is the predetermined location.

3. The method of claim 2 wherein the indication of the first location comprises geographical coordinates.

4. The method of claim 2 wherein the physical location of the first communications terminal corresponds to the first location when the first communications terminal is located within a specified distance from the first location.

5. The method of claim 2 wherein the indication of the first location is a name of a geographical area.

6. The method of claim 2 wherein the Internet Portal and the placing of the call based on the physical location of the first communications terminal are provided as a service by the communications network.

7. The method of claim 1 wherein the user-specified time of day has been received from the user to indicate when the call should be placed, wherein the user-specified time of day has been associated by the user with the physical location.

8. The method of claim 1 wherein the user-specified time of day is specified as a time window or a date/time window.

9. The method of claim 1 wherein the placing of the call based on the physical location of the first communications terminal is provided as a service by the communications network.

10. An apparatus for a mobile telephone system, the apparatus comprising:
 a location comparator operative to compare a current location of a mobile terminal to at least one predetermined location;
 a time comparator operative to compare a current time to a predetermined user-specified time of day associated with the at least one predetermined location, wherein the user-specified time of day has been received from the user to indicate when the call should be placed; and
 a controller operative to initiate a call from the mobile terminal to a predetermined number associated with the at least one predetermined location in response to a location comparator match and a time comparator match.

11. The apparatus of claim 10 wherein the user-specified time of day is a user-specified time window.

12. The apparatus of claim 10 further comprising a memory operative to store the at least one predetermined location, the predetermined user-specified time of day, and the predetermined number.

13. The apparatus of claim 10 wherein the at least one predetermined location corresponds to a geographical position or a geographical area.

14. The apparatus of claim 10 further comprising a location determinator operative to determine the current location of the mobile terminal.

15. The apparatus of claim 10 further comprising an interface operative to receive the location of the mobile terminal, wherein the interface is a communication link established with a communications network with which the mobile terminal is connected.

16. The apparatus of claim 10 wherein the apparatus is included in the mobile terminal or in a mobile telecommunications network.

17. A method of initiating a call in a mobile telephone system, comprising the steps of:
 comparing a current location of a mobile terminal to at least one predetermined location;
 comparing a current time to a predetermined user-specified time of day associated with the at least one predetermined location; and
 responsive to a location match and a time match, initiating a call from the mobile terminal to a predetermined number associated with said at least one predetermined location.

18. The method of claim 17 wherein the predetermined user-specified time of day corresponds to a time window or a date/time window.

19. The method of claim 17 further comprising the step of retrieving the at least one predetermined location, the at least one predetermined user-specified time of day, and the predetermined number from memory, and wherein the user-specified time of day has been received from the user to indicate when the call should be placed.

20. The method of claim 17 further comprising the step of receiving the location of the mobile terminal on a communication link established with a communications network with which the mobile terminal is connected.

\* \* \* \* \*